United States Patent
Simonsen

(10) Patent No.: US 10,570,624 B1
(45) Date of Patent: Feb. 25, 2020

(54) REVEAL DEVICE FOR A WALL PANEL SYSTEM

(71) Applicant: David Simonsen, Redding, CA (US)

(72) Inventor: David Simonsen, Redding, CA (US)

( * ) Notice: Subject to any disclaimer, the term of this patent is extended or adjusted under 35 U.S.C. 154(b) by 0 days.

(21) Appl. No.: 15/796,354

(22) Filed: Oct. 27, 2017

(51) Int. Cl.
*E04F 13/08* (2006.01)
*F24S 20/66* (2018.01)
*E04F 13/073* (2006.01)
*E04F 13/075* (2006.01)

(52) U.S. Cl.
CPC ........ *E04F 13/0896* (2013.01); *E04F 13/073* (2013.01); *E04F 13/075* (2013.01); *F24S 20/66* (2018.05)

(58) Field of Classification Search
CPC .............. E04F 13/0814; E04F 13/0801; E04F 13/0821; E04F 13/0889
See application file for complete search history.

(56) References Cited

U.S. PATENT DOCUMENTS

| | | | |
|---|---|---|---|
| 6,748,709 B1* | 6/2004 | Sherman | E04B 2/96 52/235 |
| 9,777,486 B1 | 10/2017 | Simonsen | |
| 2006/0179744 A1* | 8/2006 | Lynch | E04F 13/007 52/235 |
| 2009/0151291 A1* | 6/2009 | Pervan | E04F 13/0801 52/592.1 |
| 2010/0037549 A1* | 2/2010 | Lynch | E04F 13/0889 52/506.08 |
| 2010/0186343 A1* | 7/2010 | MacDonald | E04F 13/0826 52/747.1 |
| 2010/0263314 A1* | 10/2010 | MacDonald | E04F 13/0826 52/506.05 |
| 2014/0260043 A1* | 9/2014 | Cottier | E04F 13/0826 52/489.2 |
| 2015/0197940 A1* | 7/2015 | Bilge | E04F 13/07 52/489.2 |
| 2016/0168865 A1* | 6/2016 | Pervan | E04F 15/02016 52/309.1 |
| 2018/0171641 A1* | 6/2018 | Serino | E04C 2/041 |

* cited by examiner

*Primary Examiner* — Babajide A Demuren
(74) *Attorney, Agent, or Firm* — Theodore J. Bielen, Jr.

(57) ABSTRACT

A reveal device usable with fixation mechanisms for a pair of panels that include a pair of strips that are held together by a third strip to form a reveal unit. The reveal unit may contain adhesive or other filler material as well as conduits usable in the electrical or plumbing arts.

18 Claims, 3 Drawing Sheets

REVEAL DEVICE FOR A WALL PANEL SYSTEM

CROSS-REFERENCES TO RELATED APPLICATIONS

The present application claims the benefit of Provisional Patent Application 62/414,402 filed 26 Oct. 2016.

BACKGROUND OF THE INVENTION

The present application relates to a novel and useful replacement reveal system for a wall panel system.

Building facades are typically covered by a multiplicity of panels, cells, or other cladding. Generally, architectural panel systems or photovoltaic cells are used in this regard. To allow for thermal contraction and expansion, panels are separated from one another and placed on a facade. A reveal is used in present systems to fill the gap between panels for the purposes of aesthetics or protection of the facade below the panels. Reveals of prior systems have provided minimal protection of the facade below the panels and in certain cases are difficult or impossible to employ during normal installation of the panels.

A reveal device that may be used as an original or replacement reveal system that is simple to install and provides protection to the facade below the panels would be a notable advance for coverings for edifices.

SUMMARY OF THE INVENTION

In accordance with the present invention, a novel and useful reveal device used with paneling systems of the prior art is herein provided.

The device of the present invention utilizes first and second strips that are positioned adjacent one another. Each strip includes an indentation which forms a slot permitting access to the fastening mechanism below the panels employed to attach the panels to the facade. In addition, each of the first and second strips possesses a ridge that forms channels that lie along the strips. The first and second strips are positioned adjacent one another with a gap between the same.

A third strip is employed and includes first and second appendages which snugly fit within the first and second channels of the first and second strips. Thus, the third strip serves as a linking strip which holds the first, second, and third strips together as a unit. Each of the first and second strips may also provide additional channels next to the ridges that extend along the same. Adhesives may be used to occupy such adjacent channels as well as the gap between the first and second strips which may take the form of a crevice. In addition, a cavity is formed between the third strip and the second strip once the third strip links the first and second strips together to form a unit. Again, adhesive or other filler material may be transported into the cavity between the third strip and the first and second stripes. Also, the cavity may serve as a conduit tunnel or passageway, which is particularly useful when the panels employed with the reveal device of the present invention are solar panels requiring electrical or plumbing elements. In addition, any of the first, second, and third strips may be translucent or possess a finished surface.

It may be apparent that a novel and useful reveal device has been hereinabove described.

It is therefore an object of the present application to provide a reveal device that may be used as a replacement reveal system for panels that have already been installed on a facade.

Another object of the present application to provide a reveal device that may be used with panel systems that are architectural, photovoltaic, and the like types.

Another object of the present application to provide a reveal device that may be used to replace standard reveals when a panel is removed or replaced such as panels found in a dry rain screen system.

Another object of the present application to provide a reveal device that may be used to replace standard reveals that are difficult or impossible to install during the installation of the panel fastening systems.

Another object of the present application to provide a reveal device that is easily removed and serviced, as the case may be.

Another object of the present application to provide a reveal device that utilizes an adhesive or like material that is used to fill channels, crevices, or cavities found and formed by the parts of the reveal system of the present application.

Another object of the present application to provide a reveal device that is easily installed or replaced in combination with like reveal devices used in adjacent panels.

Another object of the present application to provide a reveal device that is easy to assemble and install and is compatible with like reveal devices used in a multiplicity of panels attached to a facade.

Another object of the present application to provide a reveal device that is completely compatible with prior art reveals and, also, are independent from prior art reveals.

Another object of the present application to provide a reveal device that uses components that are transparent or clear so that light may be transmitted through them in multiple directions.

Another object of the present application to provide a reveal device that provides a passage for electrical conductors, pipes, insulators, and insulation, which is consequently particularly useful in solar panel applications used to provide electrical energy or heat to building components.

Another object of the present application is to provide a reveal device that is manufactured as multiple pieces that are assembled and will not allow air or other atmospheric elements to enter the space behind such reveal device.

Another object of the present application to provide a reveal device that is capable of keeping moisture and other atmospheric elements from moving past gaskets that are installed in the panel systems.

A further object of the present application to provide a replacement reveal device that assists in guttering of water away from the building facade below installed panels.

The application possesses other objects and advantages especially as concerns particular characteristics and features thereof which will become apparent as the specification continues.

For a better understanding of the invention, reference is made to the following detailed description of the preferred embodiments thereof which should be taken in conjunction with the prior described drawings.

DETAILED DESCRIPTION OF THE PREFERRED EMBODIMENTS

Various aspects of the present application will evolve from the following detailed description of the preferred embodiments thereof which should be referenced to the prior described drawings.

Figure 1:
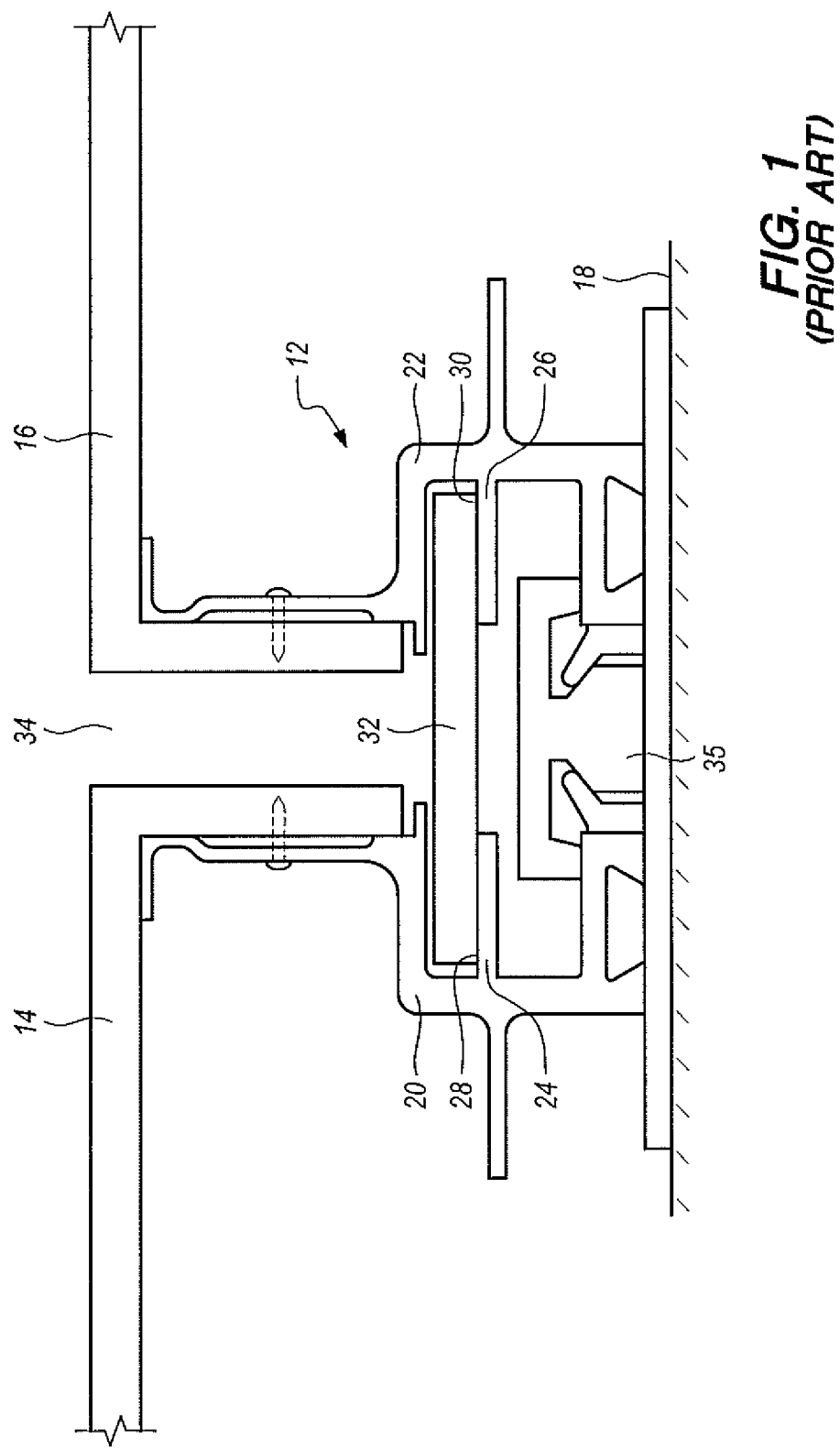
FIG. 1 is a side elevational view of a pair of panels typically installed on a facade using prior art installation components and illustrates the position of the reveal device of the present application as a replacement for prior art reveals.

Whit reference to FIG. 1, it may be seen that a prior art panel fixation system 12 is shown to connect panels 14 and 16 to a facade 18. Such system of connection is detailed in U.S. Pat. No. 9,777,486, which is incorporated by reference, as a whole, to the present application. In essence, a pair of extrusions 20 and 22 provide support arms 24 and 26 with support surfaces 28 and 30. A prior art reveal 32 lies atop support surfaces 28 and 30 below gap 34 between panels 14 and 16. A fastener 35 is employed to hold extrusions 20 and 22 in place. It is intended that the reveal device 10 of the present application be substituted for reveal 32 of fixation mechanism 12, or any other similar mechanism found in the prior art. Thus, device 10 may be considered to be a replacement as well as an original reveal device. Reveal device 10 is depicted in the drawings, FIGS. 2-5, which will be discussed in detail as the specification continues.

Figure 2:
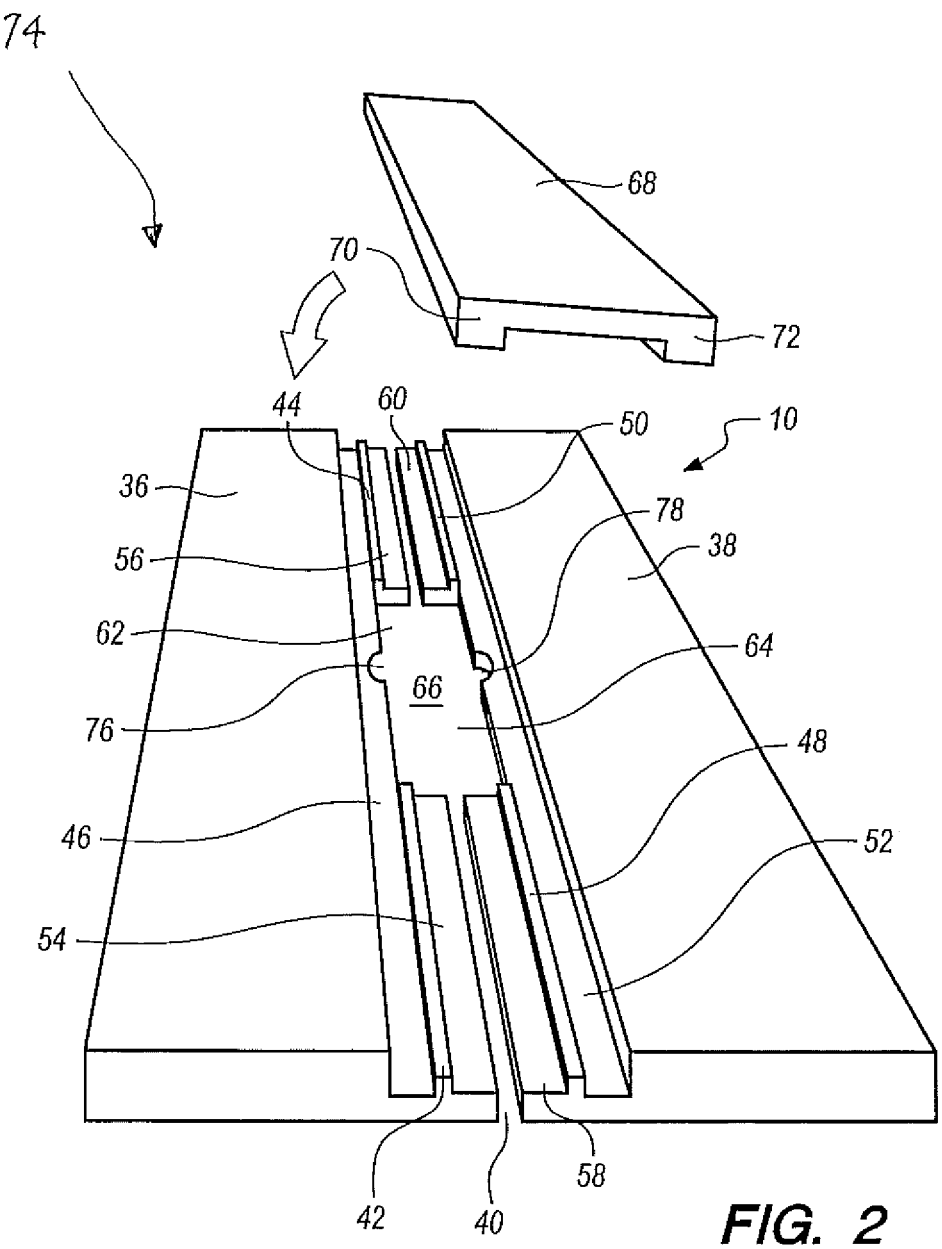
FIG. 2 is a top, left perspective view of the reveal device of the present application with a strip component depicted in exploded position from the pair of nested strips.

Turning to FIG. 2, it may be seen that reveal device 10 is formed with a first strip 26 which lies side by side with a second strip 38. It should be noted that there is a crevice or separation 40 between first strip 36 and second strip 38. Looking now at first strip 36, it may be observed that spines or ridges 42 and 44 extend along strip 36 forming a channel 46. Likewise, second strip 38 possesses spines or ridges 48 and 50 that form channel 52. In addition, ridges 42 and 44 of strip 36 form channels 54 and 56, while ridges 48 and 50 form channels 58 and 60 at strip 38. Indentations 62 and 64 of strip 36 and 38, respectively, lie opposite one another to form a slot 66.

A third strip 68 also fashioned as part of reveal device 10. Third strip 68 is constructed with first appendage 70 and second appendage 72. First appendage 70 and second appendage 72 fit snugly within channels 46 and 52, respectively. Such interaction between appendages 70 and 72 and channels 46 and 52 create a reveal device unit 74, depicted in FIGS. 4 and 5.

Figure 3:
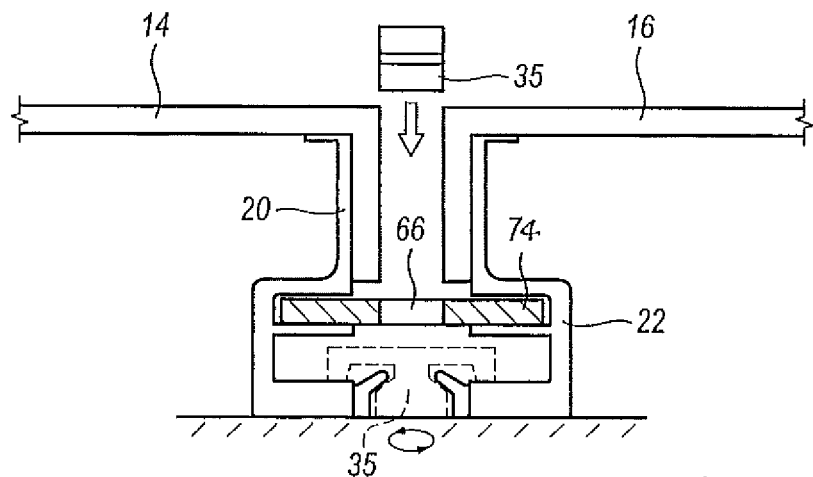
FIG. 3 is a side elevational view of the prior art installation components shown in FIG. 1 with the reveal device of the present application being substituted for a prior art reveal.

Looking again at FIG. 2, it may also be seen that notches 76 and 78 are formed in indentations 52 and 64 of first strip 36 and second strip 38, respectively. Notches 76 and 78 permit access by fasteners through slot 66. For example, fastener 35 of FIG. 1 passes through notches 76 and 78 of slot 66 and twists into place into the position shown in FIG. 1. FIG. 3 represents the movement of fastener 35 through slot 66 and into place against extrusions 20 and 22. Of course, other fasteners such as screws, nails, and the like may pass through slot 66.

Figure 4:
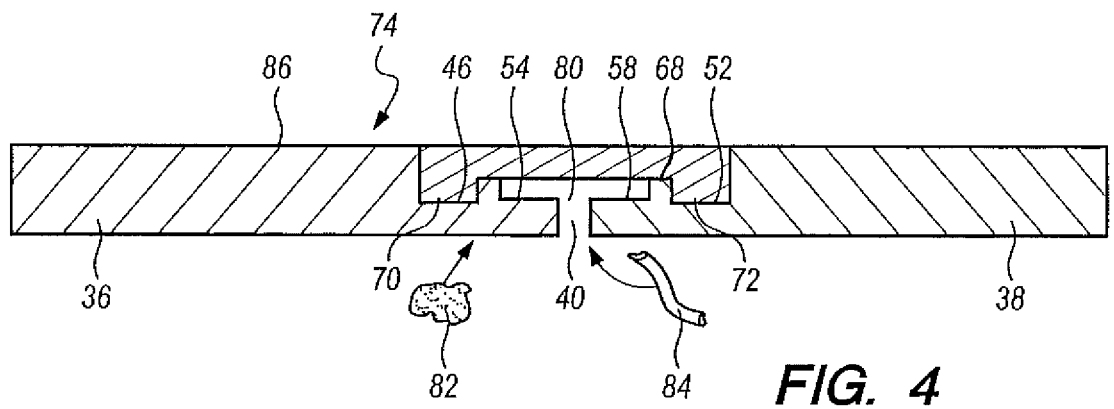
FIG. 4 is a sectional view of an assembled reveal device with an indication of items that may be placed within the openings formed within such reveal device.
Figure 5:
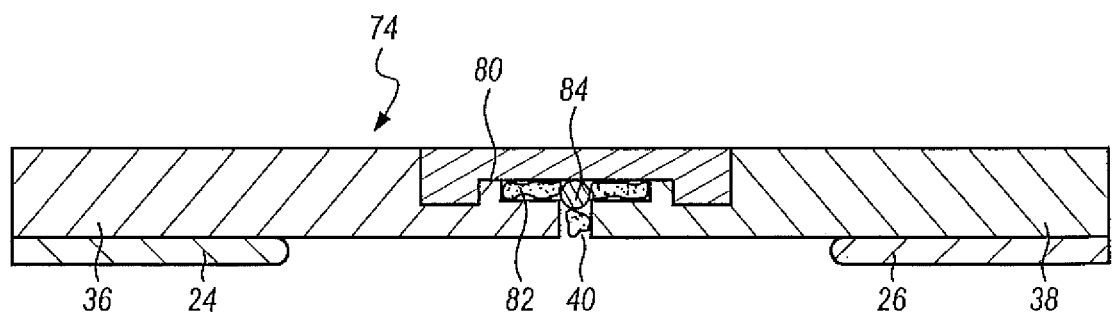
FIG. 5 is an assembled reveal device mounted on a platform provided by a prior art installation component showing the openings occupied by adhesive or conduits formed in the reveal device.

Returning now to FIGS. 4 and 5, it may be observed that a cavity 80 is also created between third strip 68 and first and second strips 36 and 38, having channels 54 and 58 as floors. Cavity 80 and crevice 40 may be employed to contain filler material such as an adhesive 82 or to hold a conduit 84. FIG. 4 represents the potential addition of such items to cavity 80 and crevice 40, while FIG. 5 shows the installation of adhesive or filler 82 and conduit 84 in cavity 80 and crevice 40. The adhesive 82, shown in FIG. 5, within crevice 40 represents excessive adhesive flowing from cavity 80 due to thermal expansion. Also, such adhesive flow avoids a hydro lock within reveal device 10. In either case, flow of adhesive 82 to top surface 86 of device 10 is avoided by permitting adhesive 82 to move into crevice 40. Female wall adhesive stops may be formed in channels 54 and 58 to control the flow of such adhesive.

In operation, the user installs unit 74 within gap 34 between panels 14 and 16 to rest upon support arms 24 and 26 or a similar base formed by prior art fixation mechanisms such as mechanism 12, FIG. 1. Prior to such installation, strips 36 and 38 are connected to strip 68 by the snapping in of appendages 70 and 72 of strip 68 to channels 46 and 52, respectively. It has been found that reveal device 10 may be used in original installations or retrofitted to replace existing reveals such as reveal 32 shown on FIG. 1.

While in the foregoing embodiments of the invention have been set forth in considerable detail for the purposes of making a complete disclosure of the invention, it may be apparent to those of skill in the art that numerous changes may be made in such details without departing from the spirit and principles of the invention.

What is claimed is:

1. A reveal device for a panel system attached to a facade, comprising:

first and second panels fixed to a facade with a gap therebetween, said first and second panels including connected first and second extrusions providing first and second support surfaces, respectively, at said gap;

a first strip configured to rest on said first support surface, said first strip including a first indentation, said first strip further including a first ridge forming an adjacent first channel;

a second strip configured to rest on said second support surface, said second strip including a second a second indentation, said first indentation of said first strip being positioned adjacent said second indentation of said second strip to form a slot, said second strip further including a second ridge forming an adjacent second channel;

a third strip, said third strip including first and second appendages, said first and second appendages snap-fitting within said first and second channels, adjacent said first and second ridges, respectively, said third strip lying apart from said support surface, said snap-fitting of said first and second appendages of said third strip within said first and second channels linking said first and second strips to one another to form a unit.

2. The device of claim 1 in which said first indentation of said first strip further comprises a first notch and said second indentation of said second strip comprises a second notch, said first and second notches lying in opposition to one another.

3. The device of claim 1 in which said first ridge of said first strip further forms a third channel apart from said first channel, and said second ridge of said second strip further forms a fourth channel.

4. The device of claim 3 in which further comprises an adhesive, said adhesive at least partially occupying said third and fourth channels.

5. The device of claim 1 in which said unit formed by said linked first and second strips further includes a crevice located between said first and second strips.

6. The device of claim 5 which further comprises an adhesive, said adhesive at least partially occupying said crevice.

7. The device of claim 1 in which said unit formed by said third strip linking said first and second strips further includes a cavity between said third strip and said first and second strips.

8. The device of claim 7 in which said first indentation of said first strip further comprises a first notch and said second indentation of said second strop comprises a second notch, said first and second notches lying in opposition to one another.

9. The device of claim 7 which further comprises an adhesive, said adhesive at least partially occupying said cavity between said third strip and said first and second strips.

10. The device of claim 9 in which said first ridge of said first strip further forms a third channel apart from said first channel, and said second ridge of said second strip further forms a fourth channel.

11. The device of claim 10 in which said unit formed by said linked first and second strips further includes a crevice located between said first and second strips.

12. The device of claim 11 in which said adhesive at least partially occupies said crevice.

13. A method of assembling and installing a reveal device in a gap between first and second extrusions supporting first and second panels, respectively, said first and second extrusions including a support surface at said gap, comprising the steps of:

providing a first strip configured to rest on said support surface, said first strip including a first indentation, said first strip further including a first ridge forming a first channel and a third channel apart from said first channel providing a second strip configured to rest on said support surface, said second strip including a second indentation, said second strip further including a second ridge forming a second channel and a fourth channel apart from said second channel, said first indentation of said first strip being positioned adjacent said second indentation of said second strip to form a slot;

providing a third strip, said third strip including first and second appendages, said first and second appendages fitting within said first and second channels, respectively;

linking said first and second strips to one another forming a unit; and providing an adhesive to at least partially occupying said third and fourth channels.

14. The method of claim 13 in which said step of linking said first and second strip to one another to form a unit further includes the step of forming a crevice between said first and second strips.

15. The method of claim 14 which further includes the step of allowing said adhesive to at least partially occupy said crevice.

16. The method of claim 14 in which said step of linking said first and second strips to one another to form a unit further includes the step of forming a cavity between said third strip and said first and second strips.

17. The method of claim 16 which further comprises forming first and second notches in said first and second indentations, respectively, said first and second notches lying in opposition to one another, following said steps of providing said first and second strips including first and second indentations, respectively.

18. The method of claim 16 which further comprises the step of providing said adhesive to at least partially occupy said cavity between said third strip and said first and second strips.

* * * * *